(12) United States Patent
Matsubara et al.

(10) Patent No.: US 9,428,590 B2
(45) Date of Patent: Aug. 30, 2016

(54) METHOD FOR DEHYDRATING HYDROUS LOW-SUBSTITUTED HYDROXYPROPYL CELLULOSE AND METHOD FOR PRODUCING LOW-SUBSTITUTED HYDROXYPROPYL CELLULOSE BY USING SAME

(71) Applicant: Shin-Etsu Chemical Co., Ltd., Tokyo (JP)

(72) Inventors: Junichi Matsubara, Niigata-ken (JP); Atsuhiko Yonemochi, Niigata-ken (JP); Mitsuo Narita, Niigata-ken (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 14/454,964

(22) Filed: Aug. 8, 2014

(65) Prior Publication Data
US 2015/0045550 A1    Feb. 12, 2015

(30) Foreign Application Priority Data
Aug. 12, 2013    (JP) ................................. 2013-167556

(51) Int. Cl.
 *C08B 11/20*    (2006.01)
 *C08B 11/08*    (2006.01)

(52) U.S. Cl.
 CPC ................ *C08B 11/20* (2013.01); *C08B 11/08* (2013.01)

(58) Field of Classification Search
 CPC .............................. C08B 11/08; C08B 11/20
 USPC .................................................. 536/124, 91
 See application file for complete search history.

(56) References Cited

U.S. PATENT DOCUMENTS 4,273,035 A    6/1981  Cusi

FOREIGN PATENT DOCUMENTS

| EP | 1 903 059 A2 | 3/2008 |
| JP | 60161759 A * | 8/1985 |
| JP | 08-231602 A | 9/1996 |

OTHER PUBLICATIONS

Search Report for European Application No. 14 179 921.3 date Jan. 16, 2015.

* cited by examiner

*Primary Examiner* — Patrick Lewis
*Assistant Examiner* — Everett White
(74) *Attorney, Agent, or Firm* — Alston & Bird LLP

(57) ABSTRACT

Reduction of the energy burden in a step of drying hydrous low-substituted hydroxypropyl cellulose (L-HPC), reduction of water content of a cake obtained by dehydration, and others are targeted. More specifically, provided is a method for dehydrating hydrous L-HPC with a compression type dehydrator by feeding the hydrous L-HPC to a screw conveyer connected to the inlet of the dehydrator, including steps of: starting the operation of the conveyer to fill the conveyer and the dehydrator with the hydrous L-HPC, starting the operation of the filled dehydrator, and feeding the hydrous L-HPC to the conveyer, while discharging dehydrated L-HPC from an outlet of the dehydrator, wherein a feed rate of feeding the hydrous L-HPC to the conveyer is equal to a discharge rate of discharging the dehydrated L-HPC in terms of net weight of cellulose ether, and a method for producing L-HPC by using the above method.

10 Claims, No Drawings

METHOD FOR DEHYDRATING HYDROUS LOW-SUBSTITUTED HYDROXYPROPYL CELLULOSE AND METHOD FOR PRODUCING LOW-SUBSTITUTED HYDROXYPROPYL CELLULOSE BY USING SAME

FIELD

The present invention relates to a method for dehydrating hydrous low-substituted hydroxypropyl cellulose by connecting a screw conveyer to an inlet of a compression type dehydrator, and a method for producing low-substituted hydroxypropyl cellulose by using the method for dehydrating.

BACKGROUND

Low-substituted hydroxypropyl cellulose is cellulose ether which is insoluble but swells in water owing to a low degree of substitution. Low-substituted hydroxypropyl cellulose is industrially produced by reacting cellulose in powder, chip, or sheet form with propylene oxide in the presence of an alkali, followed by dissolving, neutralizing, and washing the reaction product.

The washing step is usually performed successively by using a continuous horizontal vacuum filter, a horizontal table filter, or a horizontal belt filter. After washing, the filtered low-substituted hydroxypropyl cellulose is subjected to compression type dehydration in order to reduce the burden of a dryer and reduce the amount of water-soluble salts formed as a by-product.

JP 08-231602A describes a method for dehydrating water-soluble cellulose ether by using mainly a V-shaped disc press, which is a compression type dehydrator. According to JP 08-231602A, this method makes it possible to reduce the water content of the dehydrated water-soluble cellulose ether even to 35 to 40% by weight.

SUMMARY

When the present inventors dehydrated low-substituted hydroxypropyl cellulose by using a V-shaped disc press described in JP 08-231602A, which is a continuous compression type dehydrator, the water content of a cake after dehydration was at the minimum 80% by weight of the water content prior to the dehydration. Although an increase in the rotational speed of the V-shaped disc press improved the throughput capacity, the cake obtained by dehydration was likely to have higher water content due to a decrease in time of staying in the disc press.

With the foregoing in view, the present invention has been made. An object of the invention is to reduce an energy burden in a step of drying hydrous low-substituted hydroxypropyl cellulose, reduce water content of a cake obtained by dehydration, and improve the productivity and the throughput capacity of a dehydrator.

As a result of an intensive investigation with a view to achieving the above-mentioned object, the present inventors have found that when a compression type dehydrator is filled with low-substituted hydroxypropyl cellulose insoluble in water and a filling ratio is low, dehydration cannot be as high as that of water-soluble cellulose ether. It is because the low-substituted hydroxypropyl cellulose swelling with water floats in an upper portion inside the compression type dehydrator and is not compressed sufficiently. Paying attention to a filling ratio in a compression type dehydrator, the present inventors have found that reduction in water content of a cake obtained by dehydration and improvement in throughput capacity can be achieved by changing a feeding method of hydrous low-substituted hydroxypropyl cellulose and completed the invention.

In one aspect of the invention, there is provided a method for dehydrating hydrous low-substituted hydroxypropyl cellulose with a compression type dehydrator by feeding the hydrous low-substituted hydroxypropyl cellulose to a screw conveyer connected to an inlet of the compression type dehydrator, comprising the steps of: starting the operation of the screw conveyer to fill the screw conveyer and the compression type dehydrator with the hydrous low-substituted hydroxypropyl cellulose, starting the operation of the filled compression type dehydrator, and feeding the hydrous low-substituted hydroxypropyl cellulose to the screw conveyer, while discharging dehydrated low-substituted hydroxypropyl cellulose from an outlet of the compression type dehydrator, wherein a feed rate of feeding the hydrous low-substituted hydroxypropyl cellulose to the screw conveyer is equal to a discharge rate of discharging the dehydrated low-substituted hydroxypropyl cellulose in terms of net weight of cellulose ether. In another aspect of the invention, there is provided a method for producing low-substituted hydroxypropyl cellulose, comprising the steps of: reacting alkali cellulose with propylene oxide to obtain crude low-substituted hydroxypropyl cellulose, washing the crude low-substituted hydroxypropyl cellulose to obtain hydrous low-substituted hydroxypropyl cellulose, dehydrating the hydrous low-substituted hydroxypropyl cellulose by using the above-mentioned dehydrating method, and drying dehydrated low-substituted hydroxypropyl cellulose.

According to the invention, the water content of a cake obtained by dehydration of hydrous low-substituted hydroxypropyl cellulose can be reduced and at the same time, the throughput capacity can be enhanced in comparison with a conventional method, and an amount of steam used in a subsequent step of drying can be reduced.

DETAILED DESCRIPTION

The method for producing low-substituted hydroxypropyl cellulose by using a raw material pulp will next be described.

A raw material pulp may include wood pulp and linter pulp.

The raw material pulp can be immersed in an aqueous alkali solution having a concentration of preferably from 20 to 60% by weight and then compressed for removal of excess of the aqueous alkali hydroxide solution to obtain alkali cellulose having a desired composition.

The alkali cellulose may be reacted with propylene oxide through sufficient mixing. The propylene oxide may be used in an amount of preferably from 0.15 to 2.0 moles per mole of the cellulose. The blending of propylene oxide may be carried out by using any of a method of adding a required amount of propylene oxide all at once, a method of dividing the required amount into two or more portions which will be added in two or more times, and a method of adding the required amount in a continuous manner.

In the low-substituted hydroxypropyl cellulose thus obtained, the alkali used as a catalyst has remained so it may be neutralized with an acid. Neutralization may be carried out, for example, by putting the crude reaction product in water (preferably of from 20 to 60° C.) containing an acid in an amount stoichiometric to the amount of the alkali. Examples of the acid to be used include a mineral acid such as hydrochloric acid, sulfuric acid and nitric acid, and an organic acid such as formic acid and acetic acid.

After neutralization with the acid, an optional washing may be carried out. In the step of washing, byproducts such as sodium chloride may be washed away with water, preferably hot water (preferably of from 70 to 100° C.) by taking advantage of the water-insolubility of the low-substituted hydroxypropyl cellulose. This washing may be carried out successively by using a continuous horizontal vacuum filter, a horizontal table filter, or a horizontal belt filter.

The hydrous low-substituted hydroxypropyl cellulose thus obtained may then be dehydrated. The water content of the hydrous low-substituted hydroxypropyl cellulose before dehydration may preferably be from 85 to 95% by weight in consideration of the burden on a drying step to be conducted subsequently. The term "water content" as used herein means a percentage of water weight content in the weight of the hydrous low-substituted hydroxypropyl cellulose. For dehydration, a compression type dehydrator may be used. The compression type dehydrator may be an apparatus equipped with a roller or screen for compacting a material to be dehydrated, and applies a pressure to the material for dehydration. Examples of a commercially available dehydrator include a screw press (produced by Tsukishima Techno Machinery Co., Ltd.) and a V-shaped disc press ("Asahi Press" produced by Flow Dynamics). A screen type V-shaped disc press may be preferred from the standpoint of the properties of the hydrous low-substituted hydroxypropyl cellulose and the throughput capacity of the apparatus and the fact that the hydrous low-substituted hydroxypropyl cellulose itself may serve as a filtering material.

In the V-shaped disc press, dehydration is carried out by the aid of a pair of disc-shaped screens which allows the distance between the screens to decrease with rotation. These screens have pores through which water passes, and water having passed through the pores of these screens is collected. The low-substituted hydroxypropyl cellulose is, on the other hand, discharged from the rotating disc press and is collected. The rotational speed of the V-shaped disc press may preferably be from 1.0 to 2.5 rpm, more preferably from 1.5 to 2.0 rpm from the standpoint of the filling ratio in the V-shaped disc press.

The filling ratio in the compression type dehydrator can be increased by connecting a screw conveyer, which is a push-fit type apparatus, to an inlet of this compression type dehydrator. The throughput capacity of this screw conveyer may preferably be from 1.0 to 2.0 times the throughput capacity of the V-shaped disc press. The screw conveyer is not limited as long as it is equipped with a casing for covering a shaft therewith and is capable of transferring the hydrous low-substituted hydroxypropyl cellulose to the inlet of the compression type dehydrator and putting it into the compression type dehydrator without causing a loss at the screw conveyer.

More specifically, in practice, prior to the dehydration with the compression type dehydrator, the hydrous low-substituted hydroxypropyl cellulose, which is a material to be dehydrated, may be supplied into the compression type dehydrator via the screw conveyer. After the compression type dehydrator is filled fully therewith, in other words, the pressure at the inlet of the compression type dehydrator reaches preferably from 0.10 to 0.25 MPa, more preferably from 0.15 to 0.20 MPa, the compression type dehydrator may be started into operation for dehydration. When the pressure at the inlet of the compression type dehydrator is less than 0.10 MPa, the filling ratio of the hydrous low-substituted hydroxypropyl cellulose in the V-shaped disc press may be reduced. When the pressure is more than 0.25 MPa, returning of the hydrous low-substituted hydroxypropyl cellulose to the screw conveyer, so-called "back mixing," may take place.

The feed rate of the hydrous low-substituted hydroxypropyl cellulose to the inlet of the screw conveyer and the discharge rate may each preferably be from 10 to 30 kg/h, more preferably from 20 to 25 kg/h in terms of net weight of cellulose ether.

The dehydrated low-substituted hydroxypropyl cellulose may then be dried. In the step of drying, it may be dried with a drier such as a fluidized-bed drier or a drum drier. The drying temperature may preferably be from 60 to 120° C., more preferably from 80 to 100° C. The drying time varies depending on the temperature and the water content of the dehydrated cellulose ether. The drying time may preferably be from 2 to 5 hours. Since the water content of the hydrous low-substituted hydroxypropyl cellulose can be reduced in the preceding dehydration step, the amount of steam can be reduced greatly.

The dehydration of hydrous low-substituted hydroxypropyl cellulose in the method for producing low-substituted hydroxypropyl cellulose from pulp has been explained. However, according to the invention, the dehydration can be applied not only to low-substituted hydroxypropyl cellulose but also to the whole hydrous low-substituted hydroxypropyl cellulose.

EXAMPLES

The dehydration of hydrous low-substituted hydroxypropyl cellulose according to the present invention will next be described in detail by Examples and Comparative Examples.

Example 1

A pulp sheet was immersed in an aqueous 43% by weight sodium hydroxide solution at 35° C. for 5 seconds and then compressed for removing excess of the aqueous sodium hydroxide solution to obtain alkali cellulose. The weight ratio of sodium hydroxide to the cellulose and the weight ratio of the water content to the cellulose were adjusted to 0.55 and 0.90, respectively. The alkali cellulose thus obtained was shredded using a slitter cutter and placed in a pressure-resistant reactor equipped with an internal stirrer. After the reactor was purged sufficiently with nitrogen, propylene oxide was charged (at a molar ratio of 0.67 relative to the cellulose) and a reaction was carried out at 50° C. for 3 hours.

The sodium hydroxide remaining in the reaction product was neutralized with an aqueous 33% by weight acetic acid solution, and then the neutralized product was washed and filtered with hot water at 95° C. to obtain hydrous low-substituted hydroxypropyl cellulose having water content of 90% by weight as a material to be dehydrated.

Dehydration was carried out as follows. First, operation of a screw conveyor was started and via the screw conveyer, the hydrous low-substituted hydroxypropyl cellulose was supplied into a V-shaped disc press ("Asahi Press" produced by Flow Dynamics), a compression type dehydrator, at a rate of 20 kg/h in terms of net weight of cellulose ether. At the time when the filling ratio of the hydrous low-substituted hydroxypropyl cellulose in the V-shaped disc press increased and the pressure at the inlet of the V-shaped disc press reached 0.2 MPa (on the presumption that the filling ratio was 100% because the pressure did not increase any more), the operation of the V-shaped disc press was started at a rotational speed of 1.5 rpm (bayer: 0.2) so that the discharge rate from the V-shaped disc press became 20 kg/h equal to the feed rate in terms of net weight of cellulose ether. Dehydration was continued for about 2 hours while keeping the pressure at the inlet of the V-shaped disc press at 0.2 MPa. The results are shown in Table 1.

The water content in the cake obtained by dehydration of the low-substituted hydroxypropyl cellulose was determined to be 70.1% by weight of the water content of the material to be dehydrated. During operation, no reduction in the dehydration degree was observed.

Further, the amount of steam used in the step of drying was 0.50 when the amount of steam used in Comparative Example 1 is regarded as 1. In Comparative Example 1, a conventional dehydration method was employed and the water content of the cake obtained by dehydration was 82.5% by weight of the water content of the material to be dehydrated. Thus, the amount of steam was reduced greatly.

Comparative Example 1

Hydrous low-substituted hydroxypropyl cellulose obtained in the same manner as in Example 1 was supplied to a V-shaped disc press having no screw conveyer connected thereto, followed by dehydration.

The dehydration was carried out as follows. The hydrous low-substituted hydroxypropyl cellulose, a material to be dehydrated, was supplied to the V-shaped disk having no screw conveyer connected thereto at a rate of 20 kg/h in terms of net weight of cellulose ether and an attempt was made to increase the filling ratio of the hydrous low-substituted hydroxypropyl cellulose in the V-shaped disc press by taking advantage of the weight of the hydrous low-substituted hydroxypropyl cellulose. However, the weight of the hydrous low-substituted hydroxypropyl cellulose alone could not increase the pressure at the inlet of the V-shaped disc press, and the pressure at the feed port remained at 0 MPa. The filling ratio became lower than that when the screw conveyer was used. The operation of the V-shaped disc press was then started but the discharge rate was 12 kg/h in terms of net weight of cellulose ether. Dehydration was continued for about 2 hours. The results are shown in Table 1.

The water content of the cake of the low-substituted hydroxypropyl cellulose obtained by dehydration was determined to be 82.5% by weight of the water content of the material to be dehydrated.

Comparative Example 2

The operation of a screw conveyer was started first. Hydrous low-substituted hydroxypropyl cellulose obtained in the same manner as in Example 1 was supplied to the screw conveyer at a rate of 20 kg/h in terms of net weight of cellulose ether. At the time when the filling ratio of the hydrous low-substituted hydroxypropyl cellulose in the V-shaped disc press increased and the pressure at the inlet of the V-shaped disc press reached 0.2 MPa, the operation of the V-shaped disc press was started. It was operated at a discharge rate of 22.5 kg/h in terms of net weight of cellulose ether from the V-shaped disc press and a rotational speed of 2.3 rpm (bayer: 0.3) so that the pressure at the inlet of the V-shaped disc press became 0.1 MPa.

Dehydration was continued for about 2 hours while keeping the pressure at the inlet of the V-shaped disc press at 0.1 MPa. The results are shown in Table 1.

The water content of the cake of the low-substituted hydroxypropyl cellulose thus obtained by dehydration was determined to be 81.2% by weight of the water content of the material to be dehydrated.

The amount of steam used in the step of drying was 0.92 when the amount of steam used in Comparative Example 1 was regarded as 1. In Comparative Example 1, a conventional dehydration method was employed and the water content of the cake obtained by dehydration was 82.5% by weight of the water content of the material to be dehydrated. It was evident that the filling ratio in the V-shaped disc press largely affected the water content.

Comparative Example 3

The operation of a screw conveyer was started first. Hydrous low-substituted hydroxypropyl cellulose obtained in the same manner as in Example 1 was supplied to the screw conveyer at a rate of 20.0 kg/h in terms of net weight of cellulose ether. At the time when the pressure at the inlet of a V-shaped disc press reached 0.2 MPa, the operation of the V-shaped disc press was started at a discharge rate of 24.8 kg/h in terms of net weight of cellulose ether from the V-shaped disc press and a rotational speed of 3.0 rpm (bayer: 0.4). Since the feed rate largely exceeded the discharge rate, the pressure at the inlet of the V-shaped disc press during operation was 0 MPa. Dehydration was continued for about 2 hours at a discharge rate of 24.8 kg/h in terms of net weight of cellulose ether and a rotational speed of 3.0 rpm (bayer: 0.4). The results are shown in Table 1.

The water content of the cake of the low-substituted hydroxypropyl cellulose obtained by dehydration was determined to be 85.6% by weight of the water content of the material to be dehydrated.

The amount of steam used in the step of drying was 1.26 when the amount of steam used in Comparative Example 1 was regarded as 1. In Comparative Example 1, a conventional dehydration method was employed and the water content of the cake obtained by dehydration was 82.5% by weight of the water content of the material to be dehydrated. When the throughput capacity of the V-shaped disc press exceeded that of the screw conveyer, the filling ratio in the compression type dehydrator decreased and the water content of the cake obtained by dehydration increased.

TABLE 1

| | | V-shaped disc press | | | water content of cake | |
|---|---|---|---|---|---|---|
| | screw conveyer | discharge rate (kg/h) | pressure at inlet (MPa) | feed rate vs. discharge rate | obtained by dehydration[a] (% by weight) | amount of steam[b] |
| Example. 1 | Connected | 20.0 | 0.2 | feed rate = discharge rate | 70.1 | 0.50 |
| Comp. Ex. 1 | not connected | 12.0 | 0.0 | feed rate > discharge rate | 82.5 | 1.00 |

TABLE 1-continued

|  | screw conveyer | V-shaped disc press | | | water content of cake | |
|---|---|---|---|---|---|---|
|  |  | discharge rate (kg/h) | pressure at inlet (MPa) | feed rate vs. discharge rate | obtained by dehydration$^a$ (% by weight) | amount of steam$^b$ |
| Comp. Ex. 2 | Connected | 22.5 | 0.1 | feed rate < discharge rate | 81.2 | 0.92 |
| Comp. Ex. 3 | Connected | 24.8 | 0.0 | feed rate << discharge rate | 85.6 | 1.26 |

$^a$It means the water content of the cake obtained by dehydration when the water content of the material to be dehydrated is regarded as 100% by weight.
$^b$It means the amount of steam when the water content 82.5% of cake obtained by dehydration is regarded as 1.00.

The invention claimed is:

1. A method for dehydrating hydrous low-substituted hydroxypropyl cellulose with a compression type dehydrator by feeding the hydrous low-substituted hydroxypropyl cellulose to a screw conveyer connected to an inlet of the compression type dehydrator, comprising the steps of:
   starting operation of the screw conveyor to fill the screw conveyer and the compression type dehydrator with the hydrous low-substituted hydroxypropyl cellulose to obtain a filled compression type dehydrator,
   starting operation of the filled compression type dehydrator, and
   feeding the hydrous low-substituted hydroxypropyl cellulose to the screw conveyer, while discharging dehydrated low-substituted hydroxypropyl cellulose from an outlet of the compression type dehydrator,
   wherein a feed rate of feeding the hydrous low-substituted hydroxypropyl cellulose to the screw conveyer is equal to a discharge rate of discharging the dehydrated low-substituted hydroxypropyl cellulose in terms of net weight of cellulose ether,
   wherein filling the compression type dehydrator with the hydrous low-substituted hydroxypropyl cellulose results in a pressure at an inlet of the compression type dehydrator of from 0.10 to 0.25 MPa, and
   wherein the low-substituted hydroxypropyl cellulose is water insoluble but swells in water.

2. The method for dehydrating hydrous low-substituted hydroxypropyl cellulose according to claim 1, wherein filling the compression type dehydrator with the hydrous low-substituted hydroxypropyl cellulose results in a pressure at an inlet of the compression type dehydrator of from 0.15 to 0.20 MPa.

3. The method for dehydrating a hydrous low-substituted hydroxypropyl cellulose according to claim 1, wherein the hydrous low-substituted hydroxypropyl cellulose has a water content of from 85 to 95% by weight.

4. The method for dehydrating a hydrous low-substituted hydroxypropyl cellulose according to claim 1, wherein the feed rate of feeding the hydrous low-substituted hydroxypropyl cellulose to the screw conveyer is from 10-30 kg/hr.

5. The method for dehydrating a hydrous low-substituted hydroxypropyl cellulose according to claim 1, wherein the feed rate of feeding the hydrous low-substituted hydroxypropyl cellulose to the screw conveyer is from 20 to 25 kg/hr.

6. A method for producing low-substituted hydroxypropyl cellulose, comprising the steps of:
   reacting alkali cellulose with propylene oxide to obtain crude low-substituted hydroxypropyl cellulose,
   washing the crude low-substituted hydroxypropyl cellulose to obtain hydrous low-substituted hydroxypropyl cellulose,
   dehydrating the hydrous low-substituted hydroxypropyl cellulose by using the dehydrating method as claimed in claim 1 to obtain dehydrated low-substituted hydroxypropyl cellulose, and
   drying dehydrated low-substituted hydroxypropyl cellulose.

7. The method for producing low-substituted hydroxypropyl cellulose according to claim 6, wherein the alkali cellulose is obtained by immersing raw material pulp in an aqueous alkali solution.

8. The method for producing low-substituted hydroxypropyl cellulose according to claim 6, wherein the propylene oxide is in an amount of 0.15 to 2.0 moles per mole of alkali cellulose.

9. The method for producing low-substituted hydroxypropyl cellulose according to claim 6, further comprising neutralizing the crude low-substituted hydroxypropyl cellulose with an acid.

10. The method for producing low-substituted hydroxypropyl cellulose according to claim 6, wherein the step of drying dehydrated low-substituted hydroxypropyl cellulose comprises drying the dehydrated low-substituted hydroxypropyl cellulose at a temperature from 60 to 120° C. for 2 to 5 hours.

* * * * *